3,555,111
FAST CURE EPOXY RESIN COATING POWDERS CONTAINING ADDUCTS OF TRIMELLITIC ANHYDRIDE AND POLYOLS
Ronald C. Benham, Olean, N.Y., assignor to The Dexter Corporation, Hartford, Conn., a corporation of Connecticut
No Drawing. Filed Mar. 19, 1968, Ser. No. 714,330
Int. Cl. C08g 45/00, 45/14
U.S. Cl. 260—835
10 Claims

ABSTRACT OF THE DISCLOSURE

Powered epoxy resin coating compositions consisting essentially of a solid, essentially linear, epoxy resin having a molecular weight of 2000 to 6000 and an epoxide equivalency of about 2, a polyol-trimellitic anhydride hardener selected from the group consisting of adducts of trimellitic anhydride with a polyol containing at least 3 alcohol groups which has been increased in molecular weight to 400–1500 by addition of a lower alkylene oxide, and polyols containing at least six alcohol groups, said hardener providing two acid groups for each alcohol group of the starting polyol, said composition containing approximately one epoxide equivalent of resin to each acid equivalent of adduct, and a rapid cure catalyst in the proportion of about 0.2% to 1.0% by weight of said composition. While various catalysts can be employed, the preferred catalyst is triphenyl phosphine in the proportion of about 0.2% to 0.3%.

BACKGROUND OF THE INVENTION

Recent years have seen extensive development of the art of coating objects with thermosetting resin by fluidized bed or dry spray application of powdered resins to preheated objects, as well as by electrostatic spraying on cold objects followed by heat cure. Suitably the heat of the object of the heat cure is sufficient to melt the powder and permit it to flow into a continuous film. It is frequently desirable that coatings formed from such powders shall be tough and flexible so that coated items will not be damaged by impact and bending.

It is also desirable with coating powders that they become completely cured within a reasonable time and with a minimum amount of additional heating. The ideal situation is for a composition to have sufficiently rapid cure characteristics so that the initial heating of the object prior to coating with powder will be sufficient to completely cure the powder.

The problem has been, however, to provide in a single composition a combination of rapid cure and superior properties in the cured coating. In the special field of epoxy resin coatings one of the best coating powders heretofore available has been the type disclosed in U.S. Pat. 3,269,975, also assigned to applicants' assignee, wherein a bisphenol A epoxy resin is cured with a solid tetracarboxylic reaction product of two mols of trimellitic anhydride and one mol of a dihydric alcohol. These powders are very desirable in terms of final properties, providing very tough, flexible coatings, but they leave much to be desired as far as processing is concerned as the cure cycle requires heating to 200° C. for about 30 minutes.

THE INVENTION

It has now been discovered, in accordance with the present invention, that it is possible with certain combinations of high molecular weight linear epoxy resins and new type curing agents or hardeners which are adducts of trimellitic anhydride with certain polyhydric alcohols, and in the presence of small amounts of catalyst, to provide epoxy resin powders having very rapid cure rate while at the same time forming tough, flexible coatings of superior quality.

The polyol-trimellitic anhydride adduct contains two acid groups for each alcohol group of the alcohol. Thus the adduct of a triol has a functionality of 6, and that of a tetrol has a functionality of 8. Polyols which have been found effective are polyols containing at least 3 alcohol groups which have been condensed with a lower alkylene oxide such as ethylene oxide or propylene oxide to provide a molecular weight in excess of 400 and suitably in the 400–1500 range. Polyols containing six or more alcohol groups can be employed without the added alkylene oxide. In preparing the adducts the two components are simply mixed together in the proper proportions at 150 to 160° C. for a few minutes, and then cooled and ground.

While various catalysts such as tertiary amines, triphenyl sulfonium chloride, and triphenyl phosphine can lead to the desirable properties in the cured material, triphenyl phosphine appears to be unique as a catalyst which provides extremely rapid cure. In fact, at the practical temperatures of 200 to 210° C. systems which contain one acid equivalent of the hardener for each epoxy equivalent of the resin, and with as little as 0.2 to 0.3% triphenyl phosphine, will cure completely in less than five minutes, and frequently as little as 2 to 3 minutes. With such a rapid cure cycle it becomes realistic, with many substrates being coated, to look to the latent heat of a preheated substrate as providing all the heat required to melt and coalesce impinging powder and to completely cure the resulting coatings.

In the new, rapid cure systems the desired flexibility in the cured coatings appears to depend on the use of solid, essentially linear epoxy resins having long molecular chains. To this end the molecular weight of the resin should be at least 2000, and suitably in the 3000 to 6000 range, with the comparable epoxy equivalent weight (EEW) being 1500 to 3000. Resins having a molecular weight in the 2000–3000 range are of interest primarily in filled systems. Preferred linear resins are the bisphenol A resins obtained by reacting 4,4'-isopropylidenediphenol with epichlorohydrin.

In formulating compositions in accordance with the present invention the several active components can simply be mixed uniformly together in finely divided powdered form. Fillers and/or coloring agents can be employed ot provide the desired color and opacity in finished coatings. While fillers can be employed to the extent of 50 to 60% of the composition where flexibility in the coating is not a critical factor, it should be understood that for producing the optimum combinations of toughness and flexibility in cured coatings, the filler and/or coloring components should be held to a minimal amount below about 5% of the total weight of the composition.

The resin, hardener, catalyst, and filler and/or coloring agent may constitute a uniform blend of separate particles; or if desired, such a uniform blend can be fluxed, as on a heated two-roll mill, and reground to small particle size with each particle then consisting of the blended mixture of components. The latter type of fluxed and reground product provides more uniform performance in fluidized bed and dry spray and electrostatic spray coatings, since the problem of stratification of different type particles is eliminated.

In the series of examples hereinafter appearing data is presented not only with respect to preferred compositions according to the present invention, but also with respect to related compositions which exhibit substantially different performance and properties. The comparative results are believed to aid in a fuller understanding of the several factors which contribute to the unusually advantageous results achieved with the new compositions.

In all the examples, the epoxy resins employed have the following properties which are listed in the order in which the epoxy resins appear and are employed in the examples:

| Molecular weight | Epoxy equivalent weight | Softening point, °C. |
|---|---|---|
| 3,400 | 1,700 | 115–125 |
| 3,100 | 1,550 | 105–115 |
| 4,800 | 2,400 | 145–155 |
| 3,600 | 1,800 | 120–130 |
| 10,000 | 5,000 | 165–180 |
| ---------- | 1,800 | 130 |
| ---------- | 900 | 80 |
| ---------- | 1,200 | 100 |

In Examples I to IV, the various powders are prepared as follows. The resin is ground to a size distribution of 100% through 100 mesh (149 microns) and 30 to 40% through 325 mesh (44 microns). The hardener is ground separately to an average particle size of 10 microns. The resin, hardener, pigments and catalyst are mixed in the indicated proportions and blended in a suitable mixing apparatus such as a twin cone blender to provide a homogeneous mixture.

Test specimens are prepared and treated as follows. Cold-rolled steel strips 1" x 5" x 0.06" are solvent washed to remove any grease or oil and are then preheated for 15 minutes at 400° F. (about 205° C.). A hot strip is then immersed in a fluidized bed of a powdered composition for five to six seconds to acquire a coating of 10 to 15 mils thickness. The coated strip is then returned to the 400° F. oven for a supplemental curing time as indicated. After the strips have been completely cured and cooled, they are examined and tested.

A common method of testing for impact strength, flexibility and adhesion is to use an apparatus such as the Gardener Impact Tester. A weight or punch with a convex hemispherical lower surface is dropped upon the coated strip from a measured height. The product of the weight in pounds and the distance of fall in inches gives the inch-pounds of impact. The coated strip rests upon an anvil which in one version is prefectly flat. This is called the closed anvil test. In a second modification the anvil upon which the sample rests has directly below the weight a concavity into which the hemispherical end of the weight fits exactly. This is called the open anvil test. Since it deforms the steel and the coating it is the more rigorous test of flexibility, extensibility and adhesion. All of the results given here are based, unless otherwise specified, upon the open anvil test using a ⅝" punch. The limiting reading of the instrument is 160 inch-pounds. In some of the examples the coatings were found to be undamaged by an impact of 160 inch-pounds. The value is then given as greater than (>) 160 inch-pounds.

As a separate test of flexibility a coated test strip is bent around a ⅛" diameter rod until incipient cracks appear in the coating, and the angle of bending noted. When the strip bends completely around the rod, disposing the two ends in parallel relation, a maximum reading of 180° is obtained.

EXAMPLE I

A series of coating powders were prepared using the same resin, a bisphenol A resin having a molecular weight of about 3400, the same adduct in which three mols of trimellitic anhydride is reacted with one mol of a trimethylol propane-propylene oxide condensate having a molecular weight of 440, and the same triphenyl phosphine catalyst, the compositions differing primarily in the proportion of adduct to resin in the composition. The several compositions and the cure and impact characteristics of coatings made therefrom are tabulated below.

| | Composition | | | |
|---|---|---|---|---|
| | A, percent | B, percent | C, percent | D, percent |
| Component: | | | | |
| Resin | 83.45 | 86.45 | 88.20 | 88.80 |
| Adduct | 14.30 | 11.30 | 10.10 | 9.10 |
| TiO₂ powder | 1.85 | 1.85 | .20 | .20 |
| Black pigment | .15 | .15 | | |
| Red pigment | | | 1.25 | 1.25 |
| Orange pigment | | | | .40 |
| Triphenyl phosphine | .25 | .25 | .25 | .25 |

| | Impact, in./lb. | | | |
|---|---|---|---|---|
| | A | B | C | D |
| Cure time at 400° F.: | | | | |
| 2 minutes | 10–20 | 15–20 | 100 | 160 |
| 3 minutes | 30 | 60 | 150–160 | >160 |
| 4 minutes | 50–60 | 100 | >160 | |
| 10 minutes | 80 | 150 | | |

This data clearly indicates that the coating properties improve as the proportion of adduct is reduced to a level corresponding to a hexa-functional reactant.

Composition D has exhibited no change in coating characteristic after storage at 100° F. for eight months.

The following example is presented to illustrate the quite different behavior of compositions containing a trimellitic anhydride—diol adduct of the type disclosed in U.S. Pat. 3,269,975.

EXAMPLE II

Two epoxy resin coatings powders A and B were prepared having the following compositions:

| Component | Powder A, percent | Powder B, percent |
|---|---|---|
| Bisphenol A resin of mol. wt./3100 | 83.76 | 89.86 |
| Adduct of TMA and tetraethylene glycol | 13.18 | 6.40 |
| TiO₂ powder | 1.85 | 1.85 |
| Fine clay | 1.00 | 1.50 |
| Black pigment | .14 | .14 |
| Tridimethylaminomethyl phenol (2,4,6) | .07 | .25 |

Composition A supplies about 2 acid groups for each epoxy group. In a cure cycle of 20 minutes at 400° F. it reaches an impact strength of 140–160 in./lb.

Composition B supplies about one acid group for each epoxy group. Extra catalyst was used because the cure was very slow. Impact tests showed:

Cure, min.:        Impact, in./lb.
  10 ------------------------------------ 10
  20 ------------------------------------ 30
  30 ------------------------------------ 30

This composition is apparently fully cured in 20–30 min. but has a very much lower impact strength than composition A.

When compared with those compositions in Example I, however, it can be seen that the above compositions A and B, based upon the teaching of U.S. Pat. 3,269,975, require significantly greater time to cure and result in a product having significantly less impact strength.

EXAMPLE III

A powder similar to powder D in Example I was prepared using a higher molecular weight resin, and having the following composition:

Percent
Bisphenol A resin of mol. wt. 4800 ------------ 88.75
Adduct of TMA and trimethylol propane-propylene oxide condensate, mol wt. 440 -------------- 9.00
TiO₂ powder ------------------------------- .15
Orange pigment ---------------------------- 1.85
Triphenyl phosphine ------------------------ .25

This powder, cured at 400° F., gave the following properties:

Cure, min.:        Impact, in./lb.
  2 ------------------------------------- 160
  3 ------------------------------------- >160

EXAMPLE IV

A powder similar to powder D in Example I was prepared using a mixture of different molecular weight epoxy resins, and having the following composition:

| | Percent |
|---|---|
| Bisphenol A resin of mol. wt. 3600 | 68.75 |
| Bisphenol A resin of mol. wt. 10,000 | 20.00 |
| Adduct as in Example III | 9.00 |
| TiO₂ powder | .15 |
| Orange pigment | 1.85 |
| Triphenyl phosphine | .25 |

This powder, cured at 400° F., gave the following properties:

| Cure, min.: | Impct, in./lb. |
|---|---|
| 2 | 150–160 |
| 3 | >160 |

In the following examples the powders are prepared in a slightly different manner. The resin is ground to 100% through 20 mesh U.S. Standard Sieve, hardener is ground to 100% through 80 mesh, and solid catalysts are powdered to 10–20 microns. Liquid catalysts are disposed in the polyol-trimellitic anhydride adduct (hardener) before it is allowed to cool and solidify. All ingredients are then dry blended thoroughly. The mixture is then fluxed on a heated two-roll mill with the cut-off roll at 150° F. and the other roll at 70–80° F. After fluxing until homogeneous, generally about one minute, the composition is taken off in sheets, cooled, and ground to a particle size 100% through a 100 mesh screen.

The procedure for preparation of test strips and the testing thereof is as previously described except that the preheating of strips and post cure is effected at about 210° C.

In these examples the several Bisphenol A resins employed are as follows:

Resin 1—Bisphenol A resin with an epoxy equivalent weight (EEW) of 1800 and softening point of 130° C.
Resin 2—EEW 900 softening point 80° C.
Resin 3—EEW 1200 softening point 100° C.

EXAMPLE V

A resin composition is prepared using an adduct of trimetallic anhydride and trimethylol propane condensed with propylene oxide to molecular weight 440, and having the following overall composition:

| | Percent |
|---|---|
| Resin No. 1 | 88.40 |
| TMA/TP-440 adduct | 10.15 |
| Triphenyl phosphine | 0.30 |
| TiO₂ pigment | 1.05 |
| Blue pigment | 0.10 |

This composition has a gel time of 20 seconds at 210° C., and gives the following test results:

| Post cure, minutes: | Open impact, in.-lbs. | Flexibility |
|---|---|---|
| 2 | 100 | 100° |
| 3 | >160 | 180° |
| 5 | >160 | 180° |
| 10 | >160 | 180° |

Shelf Stability. After eight months at 100° F. system is as good as initially.

EXAMPLE VI

The procedures of Example V are repeated using different resins and giving the test results indicated below.

| | Comp. A, percent | Comp. B, percent |
|---|---|---|
| Component: | | |
| Resin No. 2 | 78.60 | |
| Resin No. 3 | | 83.40 |
| TMA/TP-440 adduct | 19.95 | 15.15 |
| Triphenyl phosphine | .30 | .30 |
| TiO₂ pigment | 1.15 | 1.15 |
| Results, gel time at 210° C., sec. | 20 | 20 |

| | Comp. A | | Comp. B | |
|---|---|---|---|---|
| | Open impact | Flex. | Open impact | Flex. |
| Post cure, min.: | | | | |
| 2 | 60 | 100° | 60 | 100° |
| 3 | 80 | 120° | 140 | 180° |
| 5 | 80 | 120° | 140 | 180° |
| 10 | 80 | 120° | 140 | 180° |

Comparing these results with Example V it is apparent that resin No. 3 with an epoxy equivalent weight of 1200 gives slightly lower impact strength and resin No. 2 with an epoxy equivalent weight of 900 shows a sharp drop in impact strength and significant drop in flexibility. These results indicate the need for using a resin having an EEW in excess of 1000 or molecular weight in excess of about 2000.

EXAMPLE VII

The procedures of Example V are repeated using adducts made from different trimethylol propane-propylene oxide condensates; TP-740 having a molecular weight of 740, and TP-340 having a molecular weight of 340. The full compositions in parts by weight and the comparative test results are as follows:

| | Comp. A | Comp. B |
|---|---|---|
| Component: | | |
| Resin No. 1, parts | 900 | 900 |
| TMA/TP-340 adduct | 75 | |
| TMA/TP-740 adduct | | 110 |
| Triphenyl phosphine | 2 | 2 |
| TiO₂ pigment | 20 | 20 |

| | Comp. A | | Comp. B | |
|---|---|---|---|---|
| | Open impact | Flex. | Open impact | Flex. |
| Post cure, min.: | | | | |
| 2 | 10 | 0° | 20 | 10° |
| 3 | 40 | 20° | 80 | 180° |
| 5 | 60 | 180° | >160 | 180° |
| 10 | >160 | 180° | >160 | 180° |

Compared with composition B and that of Example V it will be noted that composition A is much slower in curing.

EXAMPLE VIII

The procedures of Example V are repeated using in place of .3% of triphenyl phosphine the following catalysts:

(A)—.5% of 2,4,6-tridimethylaminomethyl phenol (liquid incorporated in the adduct)
(B)—.5% of triphenylsulfonium chloride (liquid incorporated in the adduct)
(C)—1% of 2 methyl imidazole
(D)—1% of triethylenediamine
(E)—.3% of triphenyl phosphine ethyl iodine salt The test results for these compositions compared with that of Example V are tabulated below:

| | Compositions | | | | | |
|---|---|---|---|---|---|---|
| Test | Ex. 5 | A | B | C | D | E |
| Gel time at 210° C. in secs. | 20 | >60 | >60 | 15 | 21 | 55 |
| Open impact: | | | | | | |
| 2 minutes | 100 | 60 | 20 | 60 | 10 | 10 |
| 3 minutes | >160 | 160 | 40 | 120 | 20 | 60 |
| 5 minutes | >160 | >160 | 140 | 120 | 20 | 140 |
| 10 minutes | >160 | >160 | >160 | 120 | 40 | >160 |
| Flexibility: | | | | | | |
| 2 minutes | 100° | 45° | 5° | 80° | 80° | 20° |
| 3 minutes | 180° | 180° | 120° | 180° | 180° | 80° |
| 5 minutes | 180° | 180° | 180° | 180° | 180° | 160° |
| 10 minutes | 180° | 180° | 180° | 180° | 180° | 180 |

From this data it is apparent that composition D is very poor on impact and composition C does not reach full impact strength, although both have a rapid gel time and good flexibility. Compositions B and E have slow gel times and are slow to reach full cure. Compositions A approaches Example V in time for reaching full cure, but here the catalyst is present in substantially higher concentration. While any of the catalyzed systems A to E could be desirable for some end uses it will be apparent that the triphenyl phosphine of Example V is the catalyst of choice for obtaining rapid cure to high impact strength and flexibility.

EXAMPLE IX

Two compositions are prepared as in Example V containing as hardener an adduct of trimellitic anhydride with pentaerythritol to which propylene oxide has been added to give a molecular weight of about 550. This adduct, TMA/Pep 550, is employed in amounts to provide an acid:epoxy ratio of 1:1 in composition A, and a ratio of 2:1 in composition B. The full compositions and test results are tabulated below:

|  | Comp. A, percent | Comp. B, percent |
|---|---|---|
| Component: |  |  |
| Resin No. 1 | 90.0 | 82.8 |
| TMA/Pep 550 adduct | 7.8 | 15.0 |
| TiO₂ pigment | 1.85 | 1.85 |
| Carbon Black pigment | 0.1 | 0.1 |
| Triphenyl phosphine | 0.25 | 0.25 |
| Gel time, seconds | 30 | 22 |

|  | Open impact | Flex. | Open impact | Flex. |
|---|---|---|---|---|
| Post cure, min.: |  |  |  |  |
| 2 | 100 | 90° | 10 | 30° |
| 3 | >160 | 180° | 10 | 70° |
| 5 | >160 | 180° | 10 | 70° |
| 10 | >160 | 180° | 10 | 70° |

This shows the tetrol adduct to give very good results at the 1:1 acid:epoxy ratio, and again demonstrates the importance of providing the 1:1 ratio.

EXAMPLE X

The procedures of Example V are repeated using as hardener a hexol hardener, TMA/mannitol adduct. This adduct of trimellitic anhydride and mannitol is prepared as follows:

30.36 grams of Mannitol and 192.12 grams of trimellitic were heated together in a glass beaker. At 170° C. the mix was completely melted. The temperature was increased to 200° C. At 200° C. the batch was poured on an aluminum sheet, allowed to cool and harden, and then ground to pass through a 100 mesh screen.

The full composition and the test results are tabulated below:

|  | Percent |
|---|---|
| Resin No. 1 | 91.68 |
| TMA/mannitol adduct | 5.67 |
| Triphenyl phosphine | .30 |
| Green pigment | .25 |
| Blue pigment | .10 |
| TiO₂ pigment, white | 1.00 |
| Polypropylene powder | 1.00 |

|  | Open impact, in.-pounds | Flexibility |
|---|---|---|
| Post cure, minutes: |  |  |
| 3 | 120 | 90° |
| 4 | 160 | 180° |
| 5 | >160 | 180° |
| 10 | >160 | 180° |

EXAMPLE XI

The procedures of Example V are repeated using a filled system. The full composition and the test results for this filled composition are tabulated below:

|  | Percent |
|---|---|
| Resin No. 1 | 70.50 |
| TMA/TP-440 | 8.20 |
| Powdered silica | 20.00 |
| Triphenyl phosphine | .30 |
| Iron oxide pigment | 1.00 |

|  | Open impact, in.-lbs. | Closed impact, in.-lbs. | Flexibility |
|---|---|---|---|
| Post cure, minutes: |  |  |  |
| 3 | 16 | 80 | 70° |
| 5 | 30 | >160 | 135° |
| 10 | 30 | >160 | 135° |

Filled systems never have the flexibility or the high open impact strength of unfilled systems. The results for the closed impact test, however, indicate rapid cure; and a flexibility of 135° for a filled system is considered very good.

Various changes and modifications in the powdered epoxy resin compositions herein disclosed will occur to those skilled in the art, and to the extent that such changes and modifications are embraced by the appended claims, it is to be understood that they constitute part of the present invention.

I claim:

1. A powdered epoxy resin composition consisting essentially of a solid essentially linear, epoxy resin having a molecular weight of 2000 to 6000 and an epoxide equivalency of about 2, a polyol-trimellitic anhydride adduct formed by the reaction of about 3 acid equivalents of trimellitic anhydride per each equivalent of hydroxyl group in said polyol wherein the anhydride groups of said trimellitic anhydride react essentially with the hydroxyl groups in said polyol, said polyol being selected from the group consisting of (a) polyols having been prepared by reacting an alcohol having 3 and 4 alcoholic functional groups with a lower alkylene oxide in such proportion as to increase the molecular weight of said polyol by from about 400–1500, and (b) an alcohol having at least 6 functional alcohol groups, said composition containing approximately one acid equivalent of adduct for each epoxide equivalent of resin, and a rapid cure catalyst in the proportion of about 0.2% to 1.0% by weight of said composition.

2. A powdered epoxy resin composition as defined in claim 1 wherein the catalyst employed is triphenyl phosphine in the proportion of about 0.2 to 0.3% of said composition.

3. A powdered epoxy resin composition as defined in claim 1 wherein the hardener is an adduct of trimellitic anhydride with a condensate of trimethylol propane and propylene oxide.

4. A powdered epoxy resin composition as defined in claim 1 wherein the hardener is an adduct of trimellitic anhydride with a condensate of trimethylol propane and propylene oxide having a molecular weight of about 440.

5. A powdered epoxy resin composition as defined in claim 1 wherein the hardener is an adduct of trimellitic anhydride with a condensate of pentaerythritol and propylene oxide.

6. A powdered epoxy resin composition as defined in claim 1 wherein the hardener is an adduct of trimellitic anhydride with a condensate of pentaerythritol and propylene oxide having a molecular weight of about 550.

7. A powdered epoxy resin composition as defined in claim 1 wherein the hardener is an adduct of trimellitic anhydride with mannitol.

8. A powdered epoxy resin composition as defined in claim 1 containing filler and coloring components in the proportion of 0 to 60% by weight of said powdered composition.

9. A powdered epoxy resin composition as defined in claim 8 wherein individual particles of said powder comprise a homogeneous mixture of all components present in said composition.

10. A powdered epoxy resin composition as defined in claim 8 wherein the filler and coloring components are held below about 5% by weight of the total composition, thereby providing a composition which rapidly cures to a tough flexible resin.

References Cited

UNITED STATES PATENTS

| | | | |
|---|---|---|---|
| 2,947,717 | 8/1960 | Belanger | 260—835 |
| 3,062,770 | 11/1962 | Hirsch | 260—835 |
| 3,182,073 | 5/1965 | Loncrini | 260—78 |
| 3,188,362 | 6/1965 | Delmonte | 260—835 |
| 3,269,975 | 8/1966 | Lee | 260—47 |
| 3,400,098 | 9/1968 | Parry | 260—47 |
| 3,431,237 | 3/1969 | Harry | 260—830 |
| 3,437,671 | 4/1969 | Sandler | 260—346.3 |

PAUL LIEBERMAN, Primary Examiner

U.S. Cl. X.R.

260—37, 40, 41, 47, 75, 78.4, 830, 836, 837